(12) United States Patent
Amine et al.

(10) Patent No.: US 6,420,069 B2
(45) Date of Patent: *Jul. 16, 2002

(54) POSITIVE ELECTRODE FOR LITHIUM BATTERY

(75) Inventors: Khalil Amine, Illinois, IL (US); Hideo Yasuda; Yuko Fujita, both of Kyoto (JP)

(73) Assignee: Japan Storage Bottery Co., Ltd, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/214,832
(22) PCT Filed: Jul. 22, 1996
(86) PCT No.: PCT/JP96/02049
§ 371 (c)(1), (2), (4) Date: Jun. 14, 1999
(87) PCT Pub. No.: WO98/04010
PCT Pub. Date: Jan. 29, 1998

(51) Int. Cl.⁷ ................................................ H01M 4/50
(52) U.S. Cl. ........................................ 429/224; 429/223
(58) Field of Search .................................. 429/223, 224

(56) References Cited

U.S. PATENT DOCUMENTS

| | | | |
|---|---|---|---|
| 5,169,736 A | | 12/1992 | Bittihn et al. ................ 429/194 |
| 5,316,877 A | * | 5/1994 | Thackeray et al. .......... 429/197 |
| 5,506,077 A | * | 4/1996 | Koksbang .................... 429/224 |
| 5,738,957 A | * | 4/1998 | Amine et al. ................ 429/223 |

FOREIGN PATENT DOCUMENTS

| | | | |
|---|---|---|---|
| EP | 0 712 173 A1 | 5/1996 | ............ H01M/4/50 |
| EP | 0 717 455 A1 | 6/1996 | ............ H01M/4/50 |
| GB | 2 270 195 A | 3/1994 | ............ H01M/4/50 |
| JP | 04 087268 | * 3/1992 | ............ H01M/10/40 |
| WO | 94/25398 | 11/1994 | ............ C01G/51/00 |
| WO | 96/10538 | 4/1996 | ............ C01G/45/00 |

OTHER PUBLICATIONS

Tarascon et al., J. Electrochem. Soc., vol. 138, No. 10, pp. 2859–2864, Oct. 1991.*

* cited by examiner

Primary Examiner—Carol Chaney
(74) Attorney, Agent, or Firm—Sughrue Mion, PLLC

(57) ABSTRACT

A positive electrode active material for high voltage lithium battery which is represented by general formula $Li_xMn_{2-y}M_yO_4$ $Li_xMn_{2-y}M_yO_4$ (M: a 2-valency metal (Ni, Co, Fe, Mg, Zn), with $0.45 \leq y \leq 0.60, 0 \leq x \leq 1$) having cubic spinel structure of lattice constant within 8.190 angstrom. Such an active material is manufactured by employing sol-gel process wherein one of inorganic salt, hydroxide and organic acid salt of lithium or a mixture of these for Li, one of inorganic salt and organic acid salt of manganese or a mixture of these for Mn, and one of inorganic salt and organic acid salt of the selected metal or a mixture of these for M are used as the starting materials for synthesis, ammonia water is added to the solutions of these starting materials in alcohol or water to obtain gelatinous material and the gelatinous material thus obtained is fired.

14 Claims, 5 Drawing Sheets

POTENTIAL / V vs. Li / Li⁺

POSITIVE ELECTRODE FOR LITHIUM BATTERY

BACKGROUND OF THE INVENTION

1. Field of the invention

The present invention relates to a high voltage positive electrode active material for lithium battery, more particularly, to a positive electrode active material based on lithium manganese spinel oxide wherein manganese is partially substituted with nickel

2. Description of the Related Art

As positive electrode active material for lithium battery, manganese dioxide for primary battery and vanadium oxide ($V_2O_5$), lithium cobalt oxide ($LiCoO_2$), etc. for secondary battery have already been put in practical applications, while many other materials have been proposed including lithium nickel oxide ($LiNiO_2$), lithium manganese oxide ($LiMn_2O_4$). Among these materials, lithium manganese oxide is regarded as promising because of the low cost of the production, and nontoxicity of manganese. Representative among lithium manganese oxides is the spinel oxide ($LiMn_2O_4$) Which has a three dimensional structure. Charge and discharge reactions of a lithium secondary battery wherein manganese spinel oxide is used as the positive electrode active material take place in the following two stages.

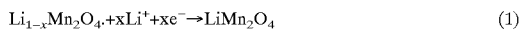

(1)

(2)

The discharge process represented by equation (1) takes place at a potential of about 4V with respect to a lithium reference electrode ($Li/Li^+$) with the crystal in this process having cubic structure, while the discharge reaction represented by equation (2) takes place at a potential of about 3V or lower with the crystal structure changing from cubic structure to tetragonal structure. Theoretical discharge capacity density is 154 mAh/g in both cases of equations (1) and (2).

However, as reported in J. Electrochem. Soc., 137,769, (1990), etc., lattice constant changes resulting in a change in the unit cell volume in the discharge process of ($0 \leq x \leq 1$), despite the crystal structure remains in cubic structure. According to Mate., Res, Bull., 18,461 (1983) and Solid State Ionics 69,59 (1994), when the value of x approaches 1 in the discharge process of $Li_xMn_2O_4$ ($0 \leq x \leq 1$) and further shifting to $Li_xMn_2O_4$ ($1 \leq x \leq 2$), the crystal structure changes from cubic structure to tetragonal structure due to Jahn-Teller effect. At this time, a great change in the unit cell volume occurs because the value of crystal lattice constant ratio c/a increases by 16%. Such a change in volume causes the electron collecting performance of the electrode to decrease, resulting in the decrease in the capacity. Because the volume change due to Jahn-Teller effect is particularly substantial, it has been common to use the battery in the region of 4V corresponding to equation (1) or in the region of 3V corresponding to equation (2). The decrease in the capacity with the process of charge and discharge processes in a battery employing lithium manganese spinel oxide as the positive electrode active material is also attributed to the dissolution of manganese ions included in the crystal into the electrolyte, as reported in J. Power Sources, 43–44, 223 (1993) and J. Power Sources, 52, 185 (1994). That is, average valence of manganese is over 3.5 during the process of equation (1), but decreases below 3.5 during the process of equation (2) during which the amount of trivalent manganese ion increases. With the presence of manganese ions having a valence of 3, a disproportionate reaction of equation (3) occurs where the produced divalent manganese ions are partially dissolved in the electrolyte of Lithium thereby, resulting in the decomposition of active material and the loss of the reversibility of the electrode.

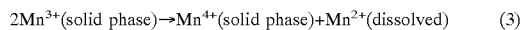

(3)

The dissolution of manganese can also be observed through change of color of the organic electrolyte from colorless to light purplish red. Thus keeping the valence of manganese as high as possible is effective in preventing the decrease in capacity.

The Journal of Electrochemical Society, 138, (10), 2859 (1991) discloses an attempt of substituting part of manganese with another metal. It is reported that, in case nickel is employed as the substituting metal, when discharging in a range from 45V to 2.0V while changing the value of y in chemical formula $Li_xMn_{2-y}Ni_yO_4$, three potential plateaus are observed at 3.9V, 2.8V and 2.2V and the discharge capacity shows greater decrease at both 3.9V plateau and 2.8V plateau as the value of y increased. This doped spinel is prepared in solid phase reaction by means of firing, while using $Li_2CO_3$, $MnO_2$ and the oxide of the partially substituting metal as the starting materials.

EP0712173A1 discloses that the use of a lithium manganese composite oxidedefect type spinel structure provides monotonous variation of the potential during charging and discharging process. Further, WO96/10538 discloses that ternary lithium mixed oxides of general formula $Li_yMeMn_{2-x}O_4$ having a spinel type in which Me means various metals, are suitable as a cathode material for a lithium secondary battery. However, both of these reference relate to conventional 4V class lithium batteries.

In the Japanese Patent Application Laid-Open No3-285262, it is reported that good cycle characteristic is obtained from an electrode fabricated from a positive electrode active material represented by general formula $Li_{1+y}Mn_{2-z}A_zO_4$ ($0 \leq y \leq 1$, $0 \leq z \leq 0.5$, and A is at least one element selected from the group consisting of Ti, V, Cr, Mo, Ni and Fe), an electricity conducting agent and a binder. A battery employing $Li_{1.1}Mn_{1.8}Co_{0.2}O_4$ as the positive electrode active material and metallic sodium as the negative electrode active material, for example, shows discharge characteristic ranging from 4.1V to 3.7V.

The Japanese Patent Application Laid-Open No.63-274059 discloses that a battery represented by a general formula $LiMn_2O_4$ employing a positive electrode active material, which shows X-ray diffraction peak of half-power width from 1.1 to 2.1 when irradiated with Fe(ka) line at a diffraction angle 46.1° and a negative electrode active material of metallic lithium has good discharge characteristic with discharge voltage being around 2.5V with a resistance of 1KΩ. The positive electrode active material is manufactured through solid phase reaction with heat treatment being applied to lithium carbonate and manganese dioxide in air at a temperature from 400 to 520° C.

The Japanese Patent Application Laid-Open No.4-87268 discloses that a battery represented by a general formula $Li_xMn_{2-y}Fe_yO_4$ ($0<x0<y<2$) employing a manganese iron-lithium compound oxide of spinel structure op similar spinel structure as the positive electrode active material and a laminated plate of aluminum and metallic lithium as the negative electrode active material shows discharge characteristic having discharge Capacity which increases When the operating voltage is in high-voltage region of 3V and 5V higher, while the discharge takes place in two stages. It is described that the active material is preferably manufactured in solid reaction by firing a mixture of oxides, hydroxides, carbonates, nitrates, etc. of Mn, Fe and Li in specified pr-proportion in an atmosphere Of air op oxygen at a temperature above 450° C., preferably from 600 to 1000° C.

In the prior art, as described above, there has been such problems that partial substitution of manganese in a spinel lithium manganese oxide with another metal exhibit two plateaus or 4V and 3V during the charge and discharge processes with the crystal structure changes as charge and discharge processes are repeated, resulting in the expansion and contraction of the unit cell volume and a decrease in the capacity.

SUMMARY OF THE INVENTION

An object of the invention is to provide a positive electrode active material for very high voltage lithium battery where charge and discharge reactions proceed in one phase reaction and a monotonous variation of the potential can be obtained, Another object of the invention is to provide a positive electrode active material for high voltage lithium battery wherein the crystal structure does not change with charge and discharge reactions, the unit cell volume experiences less change and the capacity experiences less decrease as the charge and discharge operations are repeated, and a method for manufacturing the same.

The positive electrode active material for lithium battery of the invention. represented by a general formula $Li_xMn_{2-y}M_yO_4$ (M: a 2-valence metal selected from Ni, Co, Fe, Mg and Zn with $0.45 \leq y \leq 0.60$, $0 \leq x \leq 1$) having cubic spinel structure of lattice constant within 8.190 angstrom. In the case solid phase reaction process is employed, the positive electrode active material is manufactured by repeating the process of firing lithium carbonate and nickel nitrate in a temperature range from 750 to 850° C. while applying pressure-treatment in the course . In case the sol-gel process is employed, one of inorganic Salt, hydroxide and organic acid salt of lithium or a mixture of these for Li, one of inorganic salt and organic acid salt of manganese or a mixture of these for Mn, and one of inorganic salt and organic acid salt of the selected metal or a mixture of these for M, are used as the starting materials for the synthesis. Gelling process to obtain gelatinous material by adding ammonia water to the solutions of these starting materials or alcohol or water and process to fire the gelatinous thus obtained, was carried out. to synthesize a compound $Li_xMn_{2-y}M_yO_4$ ($0 \leq x \leq 1$) with $0.45 \leq y \leq 0.60$ The above and further objects and features of the invention more fully be apparent from the following detailed description with accompanying drawings.

DESCRIPTION OF THE PREFERRED EMBODIMENTS

Nickel was selected as an example of partially substituting metal of doped manganese spinel oxide and method and conditions for synthesizing it were studied $Li_xMn_{2-y}M_yO_4$ material (M:metal, $0 \leq x \leq 1$ and $0.45 \leq y \leq 0.60$) was prepared using both the sol-gel process and the solid state reaction process.

First, solid phase reaction process described previously was tried as the method of synthesis. Various amounts of doped nickel was tried for y=0, 0.1, 0.2, 0.4 and 0.5 in the general formula $Li_xMn_{2-y}M_yO_4$, $Li_2CO_3$, LiOH and $LiNO_3$ for the lithium source and selecting NiO, $Ni(OH)_2$ $Ni(NO)_3$ and $Ni_2C_2O_4$ for the manganese source. As a result, when the value of y is within 0.2, a pure spinel phase could be easily obtained with a slight decrease in the unit cell parameter. However, when the value of y increases and particularly when it exceeds 0.2, it became difficult to substitute manganese with nickel, and impurity of NiO always remained. This tendency was observed regardless of the kind of starting materials. Thus it was found that pure spinel not be obtained when the proportion manganese substituted with nickel exceeded 0.2, although study of various starting materials and synthesis conditions showed that pure $Li_xMn_{1.5}M_{0.5}O_4$ is difficult to obtain but could be obtained if lithium nitrate, manganese carbonate nickel nitrate are used as starting materials, and if the recalcination process (firing temperature: 750 to 850° C.) after pressurization of the material is repeated several times.

Then sol-gel preparation of the nickel doped spinel $Li_xMn_{1.5}M_{0.5}O_4$ (firing temperature: 200° C. to 400° C.) was investigated by using manganese acetate (II), nickel acetate and lithium nitrate the starting materials and carbon black as stabilizing agent. it was found that pure spinel phase can be obtained much easier than in the case of the solid phase reaction described previously even when the value of y in $Li_xMn_{2-y}M_yO_4$ is 05, namely with the composition of $Li_xMn_{1.5}M_{0.5}O_4$, This reaction is assumed to proceed as follows.

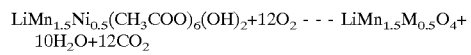

Figure 1:
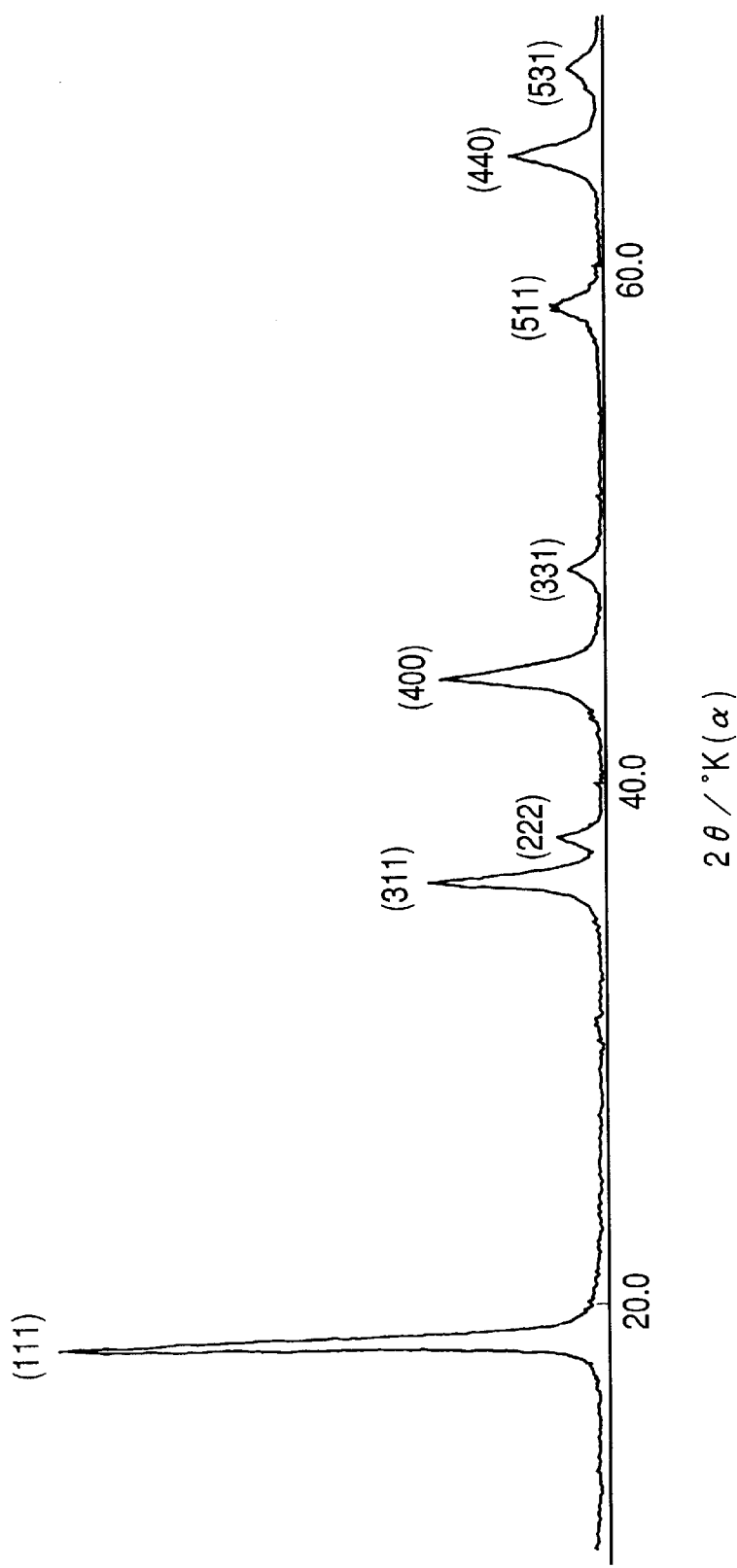
FIG. 1 shows X-ray diffraction pattern of $Li_xMn_{1.5}M_{0.5}O_4$ (x=1) prepared by the sol-gel process FIG. 2 XPS $Ni2p_{3/2}$ of NiO used as reference (FIG. 2a), $Li_xMn_{1.5}M_{0.5}O_4$ (x=1) (FIG. 2b) and $LiNiO_2$ used as reference (FIG. 2c)

$LiMn_{1.5}Ni_{0.5}(CH_3COO)_6(OH)_2+12O_2 \text{- - -} LiMn_{1.5}M_{0.5}O_4+ 10H_2O+12CO_2$ X-ray diffraction analysis of the obtained $Li_xMn_{1.5}MO_{0.5}O_4$(FIG. 1) showed a spinel structure having lattice constant of 8.174 angstrom. Ion chromatography and atomic absorption showed that its chemical composition was $Li_{1.03}Mn_{1.56+0.05}M_{0.52+0.05}O_4$ and $Li_{0.99}Mn_{1.56+0.05}M_{0.52+0.05}O_4$ As the starting material of the compound described above in the sol-gel process, organic acid salts such as formic acid salt, oxalic acid salt, citric acid salt and butyric acid salt, acetyl-acetonate complex, nitrate and sulfate are effective besides acetate described above for manganese, organic acid salts and inorganic salts similar to those used in the case of manganese are effective besides acetate described above for nickel and various partially substituting metals other than nickel, and various organic acid salts, Inorganic salts and hydroxides besides nitrate described above can be used for lithium. As for the gel stabilizing agent, carbon black is the best suited because it can be used as electron conducting material as it is the case when preparing an electrode as described previously, while carbons other than carbon black and materials having viscous property such as gelatin and polyvinyl alcohol which have been in public knowledge may also be used.

Figure 2:
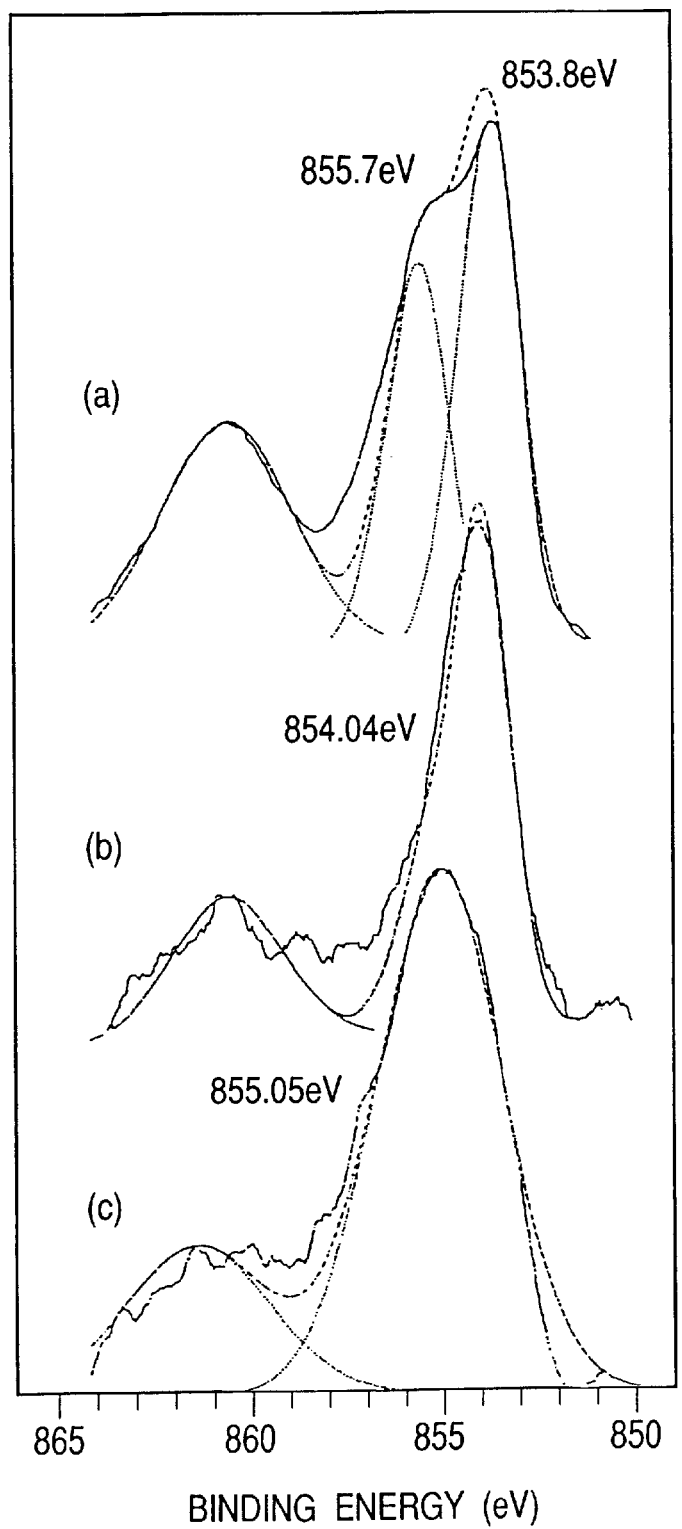

The oxidation state of $LiMn_{1.5}Ni_{0.5}O_4$ was deduced by comparing the X-ray electron spectroscopy (XPS) of the sample with several references having different oxidation states such as NiO and $LiNiO_2$. The binding energy scale was calibrated by setting the $C_{1s}$ peak of carbon at 284.3 eV. Since $Ni2p_{3/2}$ binding energy of nickel is known to be affected by both the oxidation state of the metal itself, and the nearest neighboring ligant. All nickel ions in the chosen references are surrounded by the same oxygen octahedral environment as in $LiMn_{1.5}Ni_{0.5}O_4$ sample. Therefore, the observed shift of the $Ni2p_3$, binding energy could be related only to the difference in the oxidation state of nickel ions FIG. 2 compares the $Ni2p_{3/2}$ emission spectra of NiO, $LiMn_{1.5}Ni_{0.5}O_4$ and $LiNiO_2$. The $Ni2p_{3/2}$ emission spectrum of NiO sample has asymmetric peaks showing a long tail at the higher binding energy (FIG. 2a). The asymmetry suggests the presence of nickel at different oxidation state. The overall spectrum may be deconvoluted mainly into two gaussian peaks. The binding energy of the main peak situated at 853.8 eV is similar to those reported for the nickel oxide. The peak situated at higher energy corresponds to nickel at the (+III) oxidation state. The binding energy of this peak (855.7 eV) is very close to the one observed in $LiNiO_2$ sample (855.05 eV) where nickel is in the trivalent state (FIG. 2c). This peak could arise from the presence of impurities in the NiO used in the analysis.

FIG. 2b shows the $Ni^2P_{3/2}$ emission spectra of $LiMn_{1.5}Ni_{0.5}O_4$. Only one sharp peak associated with a broad satellite is observed. The binding energy of this peak (854.04 eV) is comparable to that of NiO, and falls within the binding energies of materials having divalent nickel. This result confirms clearly the (+II) oxidation state of nickel in $LiMn^{IV}_{1.5}Ni^{II}_{0.5}O_4$ sample. In this case, and since Mn is in tetravalent state, it is therefore difficult to remove lithium from $LiMn^{IV}_{1.5}Ni^{II}_{0.5}O_4$ by considering the oxidation of $Mn^{IV}$ because of the difficulty of oxidizing these ions to higher state. However, and because of the presence of substantial amount of divalent nickel, it possible to remove lithium from $LiMn^{IV}_{1.5}Ni^{II}_{0.5}O_4$ by oxidizing $Ni^{II}$ to higher state for instance $Ni^{IV}$. As lithium is extracted from the material, a corresponding electrons are removed, these electrons come from the top of the valence band which are usually the 3d eg level in the case of metal transition such as Mn and Ni. Since there is no electron eg in $Mn^{IV}$ due to the substantial doping with divalent nickel, only the electron which are situated at the top of the eg level of nickel could be removed inducing thus the extraction of lithium from $Li_{1-x}Mn^{IV}_{1.5}Ni^{II}_{0.5}O_4$ and because the eg level of Ni has a binding energy of over 0.6 eV higher than that of Mn, it is than expected that lithium could be removed from the material $Li_{1-x}Mn^{IV}_{1.5}Ni^{II}_{0.5}O_4$ at voltage at least 0.6 V higher than that of the spinel without nickel doping (4.1 V) hereby giving a battery with a potential as high as 4.7 V.

In order to study the electrochemical properties of pure $Li_{1-x}Mn_{1.5}M_{0.5}O_4$, powder obtained as described above, a flooded type cell was made from Ketjen black as electron conducting material, PVDF as binder and stainless mesh as electron collector, two metal lithium electrodes as opposing electrodes and a mixture solution of ethylene carbonate and diethylcarbonate (1:1) including 1M of $LiPF_6$ dissolved in sulfolane was used as electrolyte because it is stable over 5V. Charge and discharge characteristic was studied by discharging to 35V after charging to 5.0V with a current density of 0.5 mA/cm². The electrochemical performance of $Li_{1-x}Mn_{1.5}Ni_{0.5}O_4$ was first investigated by cyclic voltammetry. The test was conducted at room temperature using as reference electrode $Li/Li^+$ at a scanning rate of 0.20 mV/s. The potential scan was limited to 5.1V vs. $Li/Li^+$ because of the possible electrolyte decomposition at higher voltage.

Figure 3:
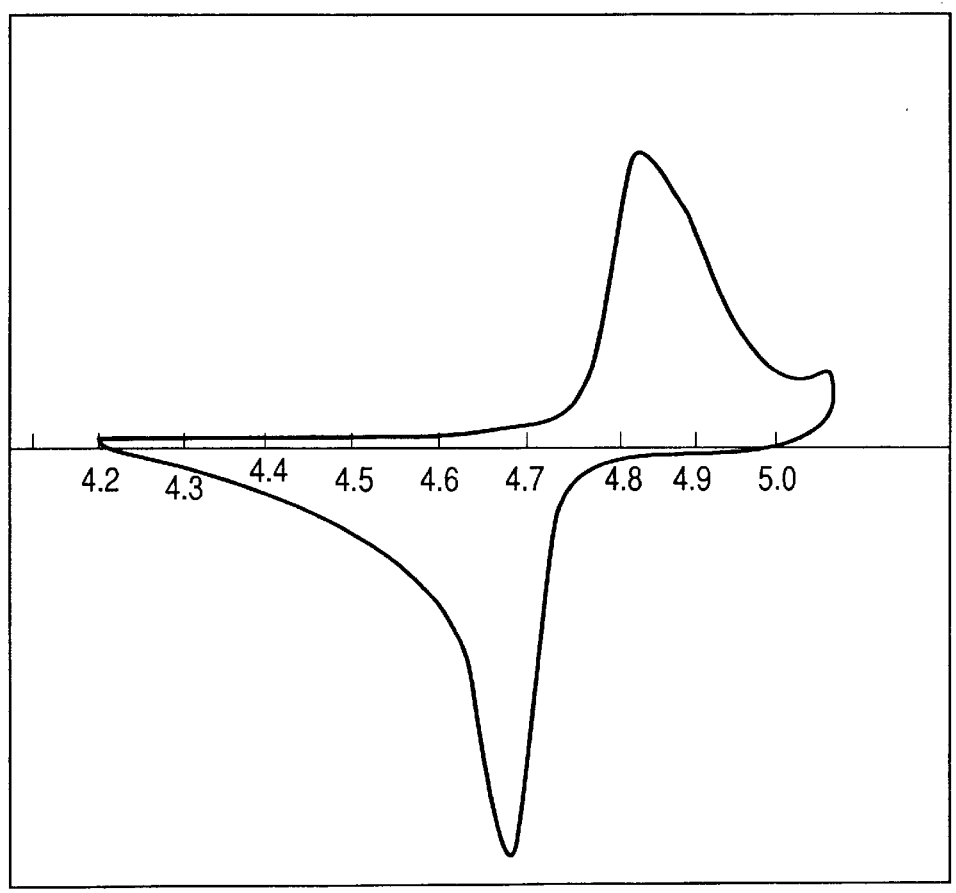
FIG. 3 Shows the cyclic voltammetry of $Li_xMn_{1.5}M_{0.5}O_4$ (x=1) in the range between 4.2V~5.1V.

FIG. 3 shows the cyclic voltammogram of $Li_{1-x}Mn_{1.5}Ni_{0.5}O_4$. Upon cycling, only one oxidation peak and one reduction peak are clearly observed at around 4.7V. The existence of these two peaks indicates a reversible one stage process for extracting and than intercalating lithium in $Li_{1-x}Mn_{1.5}Ni_{0.5}O_4$.

Figure 4:
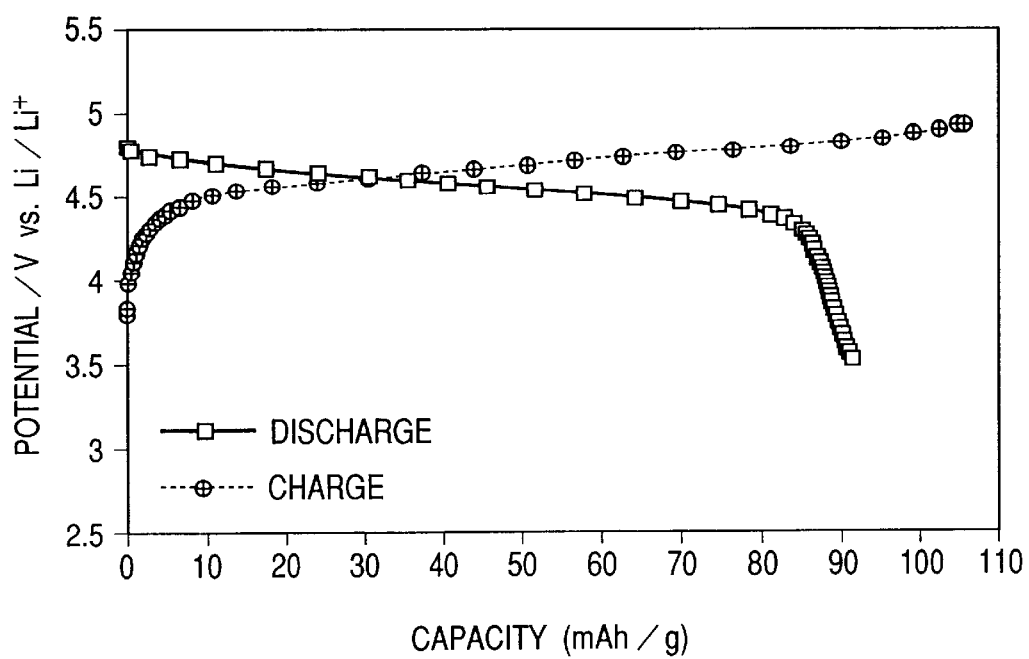
FIG. 4. shows charge and discharge characteristic of a case where $Li_xMn_{1.5}M_{0.5}O_4$ of the invention is used.

FIG. 4 shows the charge and discharge characteristics of $Li_{1-x}Mn_{1.5}Ni_{0.5}O_4$ at a current density of 0.5 mA/cm². The cell with $LiMn_{1.5}Ni_{0.5}O_4$ as the electrode was first charged to extract lithium and oxidize divalent nickel to tetravalent nickel, the charge-discharge curves present a one plateau at around 4.7 vs. $Li/Li_+$ and a capacity of 92 mAh/g. The absence of the 4V plateau in these cases could be explained by the fact that manganese ions are tetravalent in $LiMn_{1.5}Ni_{0.5}O_4$ sample and therefore it is difficult to oxidize these ions further by electrochemical extraction of lithium at 4V vs. $Li/Li^+$.

Figure 5:
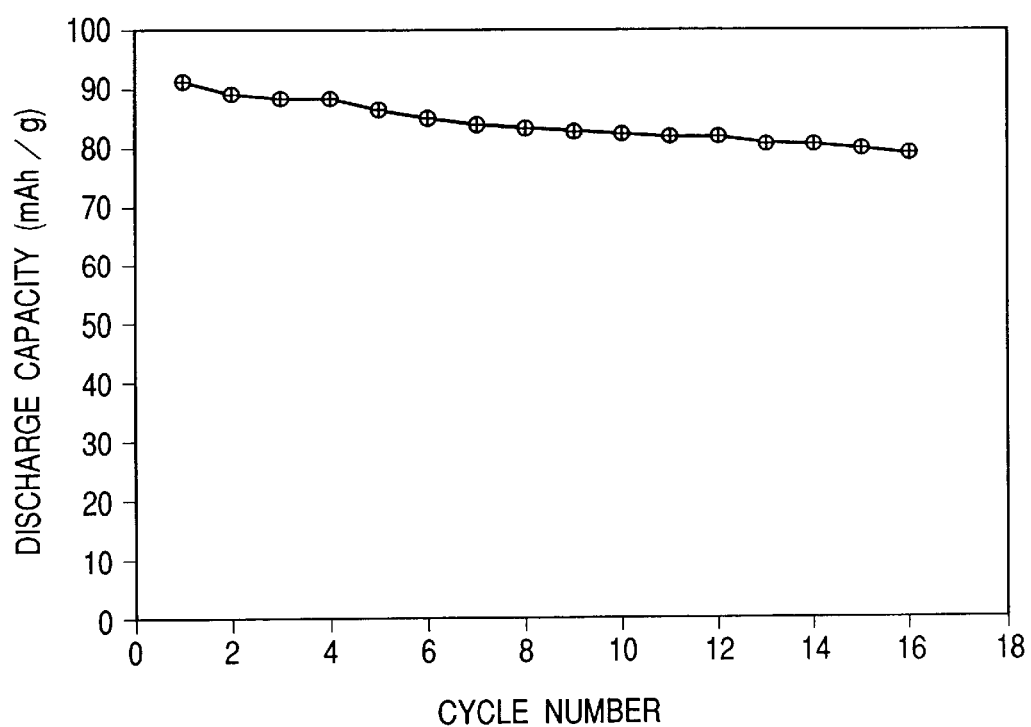
FIG. 5 shows the variation of the discharge capacity with cycle number of $Li_xMn_{1.5}M_{0.5}O_4$.

FIG. 5 shows the variation of the discharge capacity of $Li_{1-x}Mn_{1.5}Ni_{0.5}O_4$ with the cycle number. In this case, a good cyclic reversibility is observed because during the extraction of lithium the spinel structure remain regular with lithium is removed smoothly from the tetrahedral 8a channels. Such a result is totally different from the inverse spinels which shows also a high voltage of 4.8V and poor cycliability because lithium is blocked by the metal transition since they both situated in the octahedral 32 a site of the spinel and no empty channels are available for lithium diffusion in this case.

Now embodiments of the invention will be described below.

EXAMPLE I $Li_{1-x}Mn_{1.5}Ni_{0.5}O_4$ was synthesized using the sol-gel process. First, solutions of manganese acetate (II) (4 g), nickel acetate (1.5 g) and lithium nitrate (0.75 g) dissolved in 50 ml, 80 ml and 40 ml of ethyl alcohol or water, respectively, were mixed and stirred vigorously. Then 30 mg of carbon black was added as gel stabilizing agent. carbon black also serves as repressor of $Mn_2O_3$ generation in the final compound. After stirring for 30 minutes, 30 ml of 25% ammonia water was added. Precipitated substance thus obtained was dried in a rotary evaporator under vacuum, resulting in a viscous gel-like substance being produced. By coating a titanium foil with this substance and firing it at 300° C. In air for three days, the positive electrode of the invention was obtained. X-ray diffraction analysis of this sample shows that diffraction peaks of this active material is broad and lattice constant is 8.169 angstrom which is smaller than that of the conventional lithium manganese spine $LiMn_2O_4$ (8.23 angstrom). Ion chromatography and atomic absorption showed that its chemical composition was $Li_{1.03}Mn_{1.56+0.05}M_{0.52+0.05}O_4$ and $Li_{0.99}Mn_{1.56+0.05}M_{0.52+0.05}O_4$.

Then the powder thus obtained, carbon black and PVDF dissolved in NMP and coated in a stainless steel mesh then pressed to make an electrode. Using this electrode as positive electrode, a lithium foil as negative electrode, a solution (1:1) of IM $LiPF_6$ dissolved in sulfolane as the electrolyte, and a lithium reference electrode, a cell was formed. When this cell was operated with current density of 0.5 mAh/cm² and voltage range from 3.5 to 5.0V ($Li/Li^+$) to determine the charge and discharge characteristics, discharge capacity with ending voltage of 3.5V ($Li/Li^+$) was from 75 mAh/g to 125 mAh/g. The discharge capacity showed no significant difference after repeating the charging and discharging.

Charging and discharging reactions of the lithium manganese spinel oxide according to the invention proceed in a uniform one phase reaction. Moreover, the regular cubic spinel structure is maintained as the charging and discharging is carried out. resulting in better cycliability. Therefore, a new 4.7V class battery of good service life can be made by using carbon, graphite, metallic lithium or lithium alloy as the negative electrode active material: As this invention be embodied in several. forms without departing from the spirit of essential characteristics thereof, the present embodiment is therefore illustrative and not restrictive, since the scope of the invention is defined by the appended claims rather than the description preceding them, and all changes that fall within metes and bounds of the claims, or equivalence of such metes and bounds thereof are therefore intended to be embraced by the claims.

What is claimed is:

1. A 4.7 volt (vs. Li/Li$^+$) class positive electrode active material for lithium battery, wherein the general formula thereof is Li$_x$Mn$_{2-y}$M$_y$O$_4$ (M: a 2-valency metal, $0.45 \leq y \leq 0.60$, $0 \leq x \leq 1$) having a cubic spinel structure with a lattice constant of 8.190 angstrom or smaller.

2. The 4.7 volt (vs. Li/Li$^+$) class positive electrode active material for lithium battery of claim 1, wherein M is selected from the group consisting of Ni, Co, Fe, Mg and Zn.

3. A method for manufacturing a 4.7 volt (vs. Li/Li$^+$) class positive electrode active material for lithium battery represented by general formula: Li$_x$Mn$_{2-y}$M$_y$O$_4$ (M: a 2-valency metal, $0.45 \leq y \leq 0.60$, $0 \leq x \leq 1$) having a cubic spinel structure with a lattice constant of 8.190 angstrom by employing solid phase reaction.

4. The method for manufacturing the 4.7 volt (vs. Li/Li$^+$) class positive electrode active material for lithium battery of claim 3, wherein the metal M is nickel.

5. The method for manufacturing the 4.7 volt (vs. Li/Li$^+$) class positive electrode active material for lithium battery of claim 4, wherein a lithium compound, manganese compound and metal M compound are subjected to firing in the solid phase reaction, and said compounds are lithium nitrate, manganese carbonate and nickel nitrate, respectively.

6. A method for manufacturing a 4.7 volt (vs. Li/Li$^+$) class positive electrode active material for lithium battery represented by general formula Li$_x$Mn$_{2-y}$M$_y$O$_4$ (M: a 2-valency metal, $0.45 \leq y \leq 0.60$, $0 \leq x \leq 1$) having a cubic spinel structure with a lattice constant of 8.190 angstrom by employing sol-gel process, comprising the steps of:

dissolving a lithium compound, manganese compound and metal M compound in alcohol or water; adding ammonia water to the solution obtained thereby to gelatinize it; and firing the gelatinous substance thus obtained.

7. The method for manufacturing the 4.7 volt (vs. Li/Li$^+$) class positive electrode active material for lithium battery of claim 6, wherein the lithium compound is selected from the group consisting of inorganic salt of lithium, lithium hydroxide, organic acid salt of lithium and mixtures of these, the manganese compound is selected from the group consisting of inorganic salt of manganese, organic acid salt of manganese and mixtures of these, and the metal M compound is selected from the group consisting of inorganic salt of the metal M, organic acid salt of the metal M and mixtures of these.

8. The method for manufacturing the 4.7 volt (vs. Li/Li$^+$) class positive electrode active material for lithium battery of claim 6, wherein the manganese compound is selected from the group consisting of formic acid manganese, oxalic acid manganese, citric acid manganate, butyric acid manganate, manganese acetylacetonate compound, nitric acid manganate, acetic acid manganate and sulfuric acid manganate, and the metal M compound is selected from the group consisting of formic acid salt of metal M, oxalic acid salt of metal M, acetic acid salt of metal M, citric acid salt of metal M, butyric acid salt of metal M, acetylacetone compound of metal M, nitric acid salt of metal M and sulfuric acid salt of metal M.

9. The method for manufacturing the 4.7 volt (vs. Li/Li$^+$) class positive electrode active material for lithium battery of claim 6, wherein the metal M is selected from the group consisting of Ni, Co, Fe, Mg and Zn.

10. The method for manufacturing the 4.7 volt (vs. Li/Li$^+$) class positive electrode active material for lithium battery of claim 6, wherein firing temperature of the firing process is in a range from 200° C. to 400° C.

11. The method for manufacturing the 4.7 volt (vs. Li/Li$^+$) class positive electrode active material for lithium battery of claim 6, further comprising the step of: adding a gel stabilizing agent to the solution obtained.

12. The method for manufacturing the 4.7 volt (vs. Li/Li$^+$) class positive electrode active material for lithium battery of claim 11, wherein the gel stabilizing agent is selected from the group consisting of carbon black, carbons other than carbon black, gelatin and polyvinyl alcohol.

13. A high voltage lithium battery (4.7V), comprising: a 4.7 volt (vs. Li/Li$^+$) class positive electrode employing the active material of claim 1; and a negative electrode employing a material selected from the group consisting of metallic lithium, lithium alloy, carbon and graphite.

14. The 4.7 volt (vs. Li/Li$^+$) class positive electrode active material for lithium battery of claim 1, wherein the lattice constant is 8.169 angstrom or smaller.

* * * * *